United States Patent
Uenishi et al.

(10) Patent No.: US 9,458,265 B2
(45) Date of Patent: Oct. 4, 2016

(54) METHOD OF MANUFACTURING TERMINAL-MODIFIED POLYMER

(71) Applicant: The Yokohama Rubber Co., Ltd., Tokyo (JP)

(72) Inventors: Kazuya Uenishi, Kanagawa (JP); Misao Hiza, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 14/771,724

(22) PCT Filed: Feb. 21, 2014

(86) PCT No.: PCT/JP2014/054210
§ 371 (c)(1),
(2) Date: Aug. 31, 2015

(87) PCT Pub. No.: WO2014/132898
PCT Pub. Date: Sep. 4, 2014

(65) Prior Publication Data
US 2016/0009832 A1    Jan. 14, 2016

(30) Foreign Application Priority Data
Mar. 1, 2013   (JP) .................... 2013-040296

(51) Int. Cl.
| | |
|---|---|
| C08F 2/38 | (2006.01) |
| C08F 4/46 | (2006.01) |
| C08F 36/04 | (2006.01) |
| C08F 36/06 | (2006.01) |
| C08F 236/10 | (2006.01) |
| C08L 9/00 | (2006.01) |
| C08F 36/00 | (2006.01) |
| C08C 19/26 | (2006.01) |

(52) U.S. Cl.
CPC ............... *C08F 36/06* (2013.01); *C08C 19/26* (2013.01); *C08F 4/46* (2013.01); *C08F 36/00* (2013.01); *C08L 9/00* (2013.01); *C08F 2810/40* (2013.01)

(58) Field of Classification Search
CPC .............. C08F 2/38; C08F 4/48; C08F 8/42; C08F 36/04; C08F 36/06; C08F 36/08; C08F 236/10; C08L 9/00
USPC ......................................................... 526/84
See application file for complete search history.

(56) References Cited

U.S. PATENT DOCUMENTS

| | | |
|---|---|---|
| 6,166,108 A | 12/2000 | Materne et al. |
| 6,172,138 B1 | 1/2001 | Materne et al. |
| 2010/0113683 A1 | 5/2010 | Matsumoto et al. |

FOREIGN PATENT DOCUMENTS

| | | |
|---|---|---|
| GB | 2118952 A | 11/1983 |
| JP | 49-45154 | 12/1974 |
| JP | 58-194906 | 11/1983 |
| JP | 2000-143881 A | 5/2000 |
| JP | 2000-273191 A | 10/2000 |
| JP | 2007-084711 | 4/2007 |
| WO | WO 2008/123163 A1 | 10/2008 |

OTHER PUBLICATIONS

International Search Report from corresponding PCT application No. PCT/JP2014/054210 dated Apr. 22, 2014.
International Preliminary Report on Patentability and Written Opinion from corresponding PCT application No. PCT/JP2014/054210 dated Sep. 11, 2015 (6 pgs).

*Primary Examiner* — Fred M Teskin
(74) *Attorney, Agent, or Firm* — Brinks Gilson & Lione

(57) ABSTRACT

A terminal-modified polymer is manufactured by performing a polymerization reaction of a vinyl aromatic monomer, a conjugated diene monomer or both in the presence of an anionic polymerization initiator: and then adding an alkoxy aluminum compound thereinto to terminate the polymerization reaction. Alternatively, a terminal-modified polymer can also be manufactured by adding an aluminum halide compound instead of the alkoxy aluminum compound to terminate the polymerization reaction, and allowing for a reaction with a lower alcohol having 1 to 4 carbon atoms. The resulting terminal-modified polymer can improve the dispersibility of silica used as a compounding agent in rubber compositions for automobile pneumatic tires and the like.

6 Claims, No Drawings

METHOD OF MANUFACTURING TERMINAL-MODIFIED POLYMER

RELATED APPLICATION

This application is a 35 U.S.C. §371 national phase filing of International Patent Application No. PCT/JP2014/054210, filed Feb. 21, 2014, through which and to which priority is claimed under 35 U.S.C. §119 to Japanese Patent Application No. 2013-040296, filed Mar. 1, 2013, the complete disclosure of which is hereby expressly incorporated by reference.

TECHNICAL FIELD

The present invention relates to a method of manufacturing a terminal-modified polymer. More particularly, the present invention relates to a method of manufacturing a terminal-modified polymer which improves the dispersibility of silica used as a compounding agent in a rubber composition for an automobile pneumatic tire and the like.

BACKGROUND ART

Various performances required for automobile pneumatic tires include reduced rolling resistance, stability on a wet road and the like. As a method that can balance these properties, silica is compounded in a rubber composition for tires as a reinforcing filler. However, the following problem has been encountered: although silica is compounded in a rubber composition for tires, the dispersibility of silica into the rubber composition is low. Therefore, even in a case where a large amount of silica can be added, the effect of silica can not be fully obtained.

Patent Document 1 describes a method of manufacturing an elastomer/filler composite useful as a tire component and the like, the method comprising forming in situ a reinforcement filler from a precursor thereof in an elastomer•host material to uniformly disperse the reinforcement filler. In this case, in order to compound silica as a filler, a reaction from a filler precursor is required in Patent Document 1.

Patent Document 2 describes a method of manufacturing an elastomer/filler composite material, comprising: blending a filler precursor, a condensation reaction accelerator and an elastomer host (A) or (B) in a closed mixer to initiate a condensation reaction of the filler precursor; adding an organosilane material and a filler/filler precursor to the closed mixer before completion of the condensation reaction to allow for a reaction with regard to the elastomer host (A) and optionally the elastomer host (B); and collecting the resulting elastomer/filler composite material. Further the document states that this composite material may be used as an active ingredient of a rubber composition for tires, in particular a rubber composition for tire treads.

This document describes that the elastomer host (A) is a homopolymer of a conjugated diene or a copolymer of a conjugated diene and a vinyl aromatic monomer while the elastomer host (B) is an elastomer based on at least one diene terminally functionalized with alkoxy metal, wherein this diene based elastomer is represented by the following general formula (claim 5, paragraph [0014]):

elastomer-X—(OR)$n$ wherein elastomer: a homopolymer of a conjugated diene or a copolymer of a conjugated diene and a vinyl aromatic monomer
X: a metal comprising Si, Ti, Al or B
R: a $C_1$-$C_4$ alkyl group
n: 3 for Si and Ti, and 2 for Al and B However, Patent Document 2 only describes, in Examples, that styrene and 1,3-butadiene is copolymerized in an organic solvent in the presence of a lithium based catalyst, and then the resulting elastomer is collected. The document does not describe a method of manufacturing a terminal-modified polymer in which an —X—(OR)n group is introduced as an elastomer terminal group.

Further, Patent Document 3 describes a method of manufacturing a terminal acid anhydride group-containing polymer, comprising: allowing an ate complex comprising a living polymer and a typical metal element such as aluminum to react with a diester compound such as di-tert-alkyl maleate to prepare a polymer having a terminal diester group; and then the diester group is converted into an acid anhydride group.

With regard to the ate complex used in the above method, in a case where anionic polymerization of styrene is first performed using butyl lithium, a polymer terminal will become —$C^-Li^+$ unless the reaction stops. $Li^+$ in this —$C^-Li^+$ belongs to a hard acid as used in the field of the HSAB theory, and therefore the paired —$C^-$ shows high reactivity. In general, the —$C^-$ being highly reactive (nucleophilic) also attacks a carbonyl carbon under this condition. As a result of this, introduction of an acid anhydride group is difficult. Therefore, it is carried out that a hard acid is often converted into a soft acid.

As a method of achieving this, an approach is used in the above patent document in which the reactivity is reduced by using a trialkyl aluminum compound having no leaving group, i.e., by transforming —$C^-Li^+$ into —$C^-(AlR_3Li)^+$.

PRIOR ART DOCUMENTS

Patent Literature

Patent Document 1: JP-A-2000-273191
Patent Document 2: JP-A-2000-143881
Patent Document 3: JP-A-2007-084711

OUTLINE OF THE INVENTION

Problem to be Solved by the Invention

An object of the present invention is to provide a method of manufacturing a terminal-modified polymer which improves the dispersibility of silica used as a compounding agent in a rubber composition for an automobile pneumatic tire and the like.

Means for Solving the Problem

An object of the present invention can be achieved by using a method of manufacturing a terminal-modified polymer, comprising: performing a polymerization reaction of a vinyl aromatic monomer, a conjugated diene monomer or both in the presence of an anionic polymerization initiator and then adding an alkoxy aluminum compound thereinto to terminate the polymerization reaction. Alternatively, a terminal-modified polymer can also be manufactured by adding an aluminum halide compound instead of the alkoxy aluminum compound to terminate the polymerization reaction, and allowing for a reaction with a lower alcohol having 1 to 4 carbon atoms.

Effect of the Invention

In the case of the terminal-modified polymer manufactured by the method according to the present invention, an alkoxy aluminum group can be easily introduced into a polymer terminal using an alkoxy aluminum compound or a its equivalent as a terminator for the polymerization reaction.

When the obtained terminal-modified polymer is compounded as one component in a silica-containing rubber composition for pneumatic tires, the dispersibility of silica compounded into the rubber composition can be improved. As a result, the objective of simultaneous achievement of the reduction of rolling resistance and the stability on a wet road, inherent to silica, can be sufficiently satisfied.

EMBODIMENTS FOR CARRYING OUT THE INVENTION

A polymer to be modified at a terminal group is formed as a polymer of a vinyl aromatic monomer, a conjugated diene monomer or both. Vinyl aromatic monomers include styrene, α-methylstyrene, p-methylstyrene, 2,4,6-trimethylstyrene, vinyltoluene, 1-vinylnaphthalene and the like, and preferably styrene is used. Conjugated diene monomers include, for example, 1,3-butadiene, isoprene, 1,3-pentadiene, 2,3-dimethyl-1,3-butadiene, 1,3-hexadiene, chloroprene and the like, and preferably 1,3-butadiene or isoprene is used. Further, both of these vinyl aromatic monomers and conjugated diene monomers can be used in combination at any mixing ratio, and preferably both of styrene and 1,3-butadiene or isoprene are used. When both of these are used in combination, the resulting polymer is generally a random copolymer, but it may be a block copolymer.

The polymerization reaction is performed by the anionic polymerization method in which an anionic polymerization initiator is used. As an anionic polymerization initiator, used is an organolithium compound, preferably alkyl lithium or aryl lithium.

Alkyl lithiums include, for example, methyl lithium, ethyl lithium, propyl lithium, n-butyl lithium, sec-butyl lithium, tert-butyl lithium, isobutyl lithium, hexyl lithium, octyl lithium, tetramethylene dilithium, m-diisopropenylbenzene dilithium and the like. Aryl lithiums include, for example, phenyl lithium, tolyl lithium and the like. These may be used alone or in combination of two or more, and n-butyl lithium, sec-butyl lithium and tert-butyl lithium are preferred in view of handling and industrial economic efficiency, and n-butyl lithium and sec-butyl lithium are more preferred in view of reactivity with monomers.

In general, these organolithium compounds are used in a rate of about 0.0001 to 10 mol %, preferably about 0.0005 to 6 mol % relative to the amount of a charged monomer (mixture).

To the polymerization reaction system, added is 2,2-ditetrahydrofurylpropane, N,N,N',N'-tetramethylethylenediamine, diethyl ether, monoglyme, diglyme, dimethoxyethane, tetrahydrofuran and the like which are used at a rate of about 10 to 300 mol %, preferably about 40 to 200 mol % relative to the molar quantity of an initiator used. These compounds act as anion initiators and activators for a growing species or randomizers during copolymerization reaction when a nonpolar solvent such as cyclohexane or methylcyclohexane is used for the polymerization reaction.

The polymerization reaction may be performed, for example, under the conditions of about −100 to 100° C., generally about 0 to 70° C. for about 1 to 5 hours using a hydrocarbon-based solvent such as cyclohexane, methylcyclohexane, toluene and tetrahydrofuran. Subsequently, an alkoxy aluminum compound is added to the polymerization reaction system to terminate the polymerization reaction.

The alkoxy aluminum compound is used in an amount sufficient for introducing a terminal group of the produced polymer, and is used, for example, at a rate of about 33 to 1000 mol %, preferably about 100 to 400 mol % relative to the molar quantity of an anionic polymerization initiator used.

As the alkoxy aluminum compound, used is a trialkoxy aluminum such as triethoxy aluminum, triisopropoxy aluminum and tri-sec-butoxy aluminum. Preferably, triisopropoxy aluminum is used.

The polymerization reaction may be terminated also by adding an aluminum halide compound, preferably trichloroaluminum instead of an alkoxy aluminum compound. An alkoxyl group may be formed also by forming a group derived from an aluminum halide compound at a polymer terminal, and then allowing for a reaction with a lower alcohol such as methanol, ethanol, isopropanol and n-butanol.

The aluminum halide compound is used in an amount sufficient for introducing a terminal group in the produced polymer as a same in the case of the alkoxy aluminum compound, and is used, for example, at a rate of about 33 to 1000 mol %, preferably about 100 to 400 mol % relative to the molar quantity of an anionic polymerization initiator to be used. Anionic polymerization used herein is a polymerization method which proceeds along the following processes:

1) A growing species is generated by a nucleophilic attack of an initiator on a monomer.

2) The growing species further nucleophilically attacks the monomer and a polymer having a growing terminal is generated by repeating this process.

3) The growing species at a polymer terminal nucleophilically attacks a terminator to terminate the polymerization.

As a result, each one of terminal to initiate and terminal to terminate will be introduced into one polymer chain. Therefore, ideally, a terminator will be used preferably in 1:1, i.e., at a rate of 100% relative to an initiator, but the lower limit is set at about 33 mol % herein considering that the terminator used in the present invention is $AlX_3$, i.e., trivalent. Further, the amount of a lower alcohol used for forming an alkoxyl group is one that is sufficient to completely convert a halogen group introduced as a terminal group into an alkoxyl group.

The alkoxy aluminum compound forms an $Al(OR)_2$ group at least at a terminus of the polymer molecule. For example, in a case where styrene and 1,3-butadiene are used as comonomers, or 1,3-butadiene is used alone as a monomer, a reaction is performed according to the following formula to form a modified polymer having a terminal $Al(OR)_2$ group along with a $-[Al(OR)_2O]n-$ bond (n: 0 to 50):

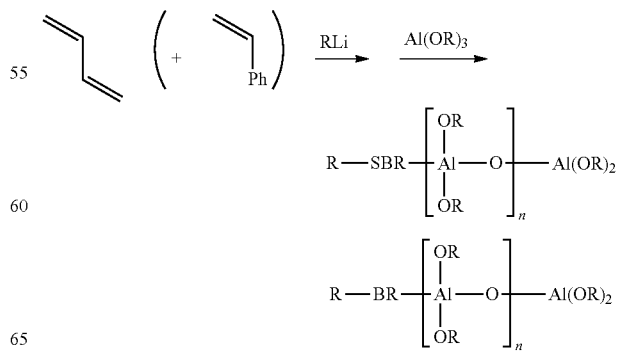

The resulting terminal-modified polymer is to be compounded in a diene-based rubber, in particular, a silica containing diene-based rubber. The terminal-modified polymer is to be used at a rate of 0.1 to 30 parts by mass, preferably 1 to 10 parts by mass, relative to the total amount of 100 parts by mass including a diene-based rubber. In a case where the ratio of the terminal-modified polymer used is less than this, desired modification effects may not be obtained. On the other hand, in a case where it is used at more than this ratio, processability of an unvulcanized rubber may be decreased.

As the diene based rubber, natural rubber (NR), isoprene rubber (IR), butadiene rubber (BR), chloroprene rubber (CR), butyl rubber (IIR), nitrile rubber (NBR), styrene-butadiene rubber (SBR) and the like can be used alone or as a blended rubber, and preferably NR, BR or a blended rubber thereof can be used. As SBR, any of emulsion-polymerized SBR (E-SBR) and solution-polymerized SBR (S-SBR) can be used. Particular preferably, the same diene-based rubber as a polymer having an intramolecular double bond, which is used for terminal modification, is used.

Silica or both silica and carbon black may be added to a diene-based rubber composition in an amount of 10 to 150 parts by mass, preferably 30 to 150 parts by mass per 100 parts by mass of a diene-based rubber containing a terminal-modified polymer. The addition of these fillers, in particular silica, can reduce rolling resistance and the like. Contrary to this, however, when used at more than this ratio, rolling resistance and the like may be deteriorated.

As the silica, used are those having a BET specific surface area (according with ASTM D1993-03) of 70 to 200 m$^2$/g, preferably 70 to 190 m$^2$/g. These are a dry-process silica manufactured by pyrolysis of silicon halides or organosilicon compounds and the like and a wet-process silica manufactured by acid decomposition of sodium silicate and the like. A wet-process silica is preferably used in view of cost and performance. Actually, commercially available products currently on the market for use in the rubber industry can be used as they are.

In order to enhance characteristics required for silica and the dispersibility in a diene-based rubber (silica has a poor affinity with rubber polymers, and also has a characteristic in which silica mutually forms a hydrogen bond in a rubber through a silanol group, resulting in a decreased dispersibility of silica into the rubber), a silane coupling agent is to be compounded in an amount of 1 to 20 parts by mass, preferably about 3 to 18 parts by mass per 100 parts by mass of a diene-based rubber containing a terminal-modified polymer. As the silane coupling agent, the following are preferably used: bis(trialkoxysilylpropyl)sulfide which has an alkoxysilyl group that reacts with a silanol group on the surface of silica and a sulfur chain that reacts with a polymer,

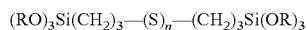

R: an alkyl group having 1 to 2 carbon atoms
n: an integer of 1 to 4
for example, bis(3-triethoxysilylpropyl)tetrasulfide, bis (2-triethoxysilylethyl)tetrasulfide, bis(3-trimethoxysilylpropyl)tetrasulfide, bis(3-triethoxysilylpropyl) disulfide and the like.

As the carbon black, commonly used is furnace black such as SAF, ISAF, HAF, FEF, GPF and SRF. Such a carbon black, which is an effective component for forming a tread part, in particular a cap tread part, of a pneumatic tire is used along with silica in a rate of 3 to 120 parts by mass per 100 parts by mass of a diene-based rubber containing a terminal-modified polymer.

In a rubber composition comprising each component described above as an essential component, sulfur as a vulcanizing agent and any one or more of vulcanization accelerators such as thiazole-based agents (MBT, MBTS, ZnMBT and the like), sulfenamide-based agents (CBS, DCBS, BBS and the like), guanidine-based agents (DPG, DOTG, OTBG and the like), thiuram-based agents (TMTD, TMTM, TBzTD, TETD, TBTD and the like), dithiocarbamate-based agents (ZTC, NaBDC and the like) and xanthate-based agents (ZnBX and the like), preferably a sulfur-containing vulcanization accelerator are to be compounded Further, other compounding agents commonly used as compounding agents for rubber may be appropriately compounded, if desired, including, for example, a reinforcing agent or a filler such talc, clay, graphite and calcium silicate, a processing aid such as stearic acid; zinc oxide, a softener, a plasticizers, an antioxidant and the like.

A composition can be prepared by kneading with a kneading machine or a mixer such as a kneader and a Banbury mixer, and an open roll and the like by a general method. After molded into a predetermined shape, the resulting composition is vulcanized at a vulcanizing temperature depending on the types of diene-based rubber, vulcanizing agent, vulcanization accelerator used and a compounding ratio thereof to form a tread part of a pneumatic tire and the like.

EXAMPLES

Next, the present invention will be described with reference to Examples.

Example 1

To a 100 ml two-necked flask,
cyclohexane (Kanto Chemical Co., Inc.) 7 ml
2,2-ditetrahydrofurylpropane 0.248 g (1.35 mmol)
(Tokyo Chemical Industry Co., Ltd.)
n-hexane solution of n-BuLi 2 ml (3.30 mmol)
(Kanto Chemical Co., Inc.; concentration: 1.65 mol/L)
were charged under the conditions of room temperature, and to the resulting solution,
styrene (the same manufacturer as above) 5.90 g (56.6 mmol)
was added dropwise at 0° C., and stirred for 3 hours. Subsequently, a suspension of 1.35 g (6.61 mmol) of triisopropoxy aluminum (the same manufacturer as above) in 10 ml tetrahydrofuran was added to terminate the polymerization reaction.

The obtained reaction mixture was filtered using a filter paper, volatile components were distilled off from the filtrate, and the residue was dissolved in 30 ml of tetrahydrofuran. Then the solution was added dropwise to 200 ml of methanol to separate a methanol soluble component and a methanol insoluble component. The same procedure was repeated twice, and volatile components were distilled off to obtain 5.78 g (yield: 98%) of a white solid terminal-modified polystyrene.
Mn: 2960
Mn (the number average molecular weight) was measured by SEC (size exclusion type chromatography), and a value of Mn was estimated as a polystyrene reduced molecular weight
PDI: 1.1

PDI (polydispersity index) was calculated as Mw/Mn using values of Mw (the weight average molecular weight) and Mn, which were measured by SEC A value of PDI being closer to 1 indicates that a polymer having a more controlled molecular weight distribution was obtained $R_f$: 0.86

A value of $R_f$ was measured by TLC (thin layer chromatography) with a silica plate, and a smaller value indicates a higher affinity with silica $^1$H-NMR (CDCl$_3$, 20° C.): δ=7.3 to 6.9 (br)
6.9 to 6.7 (br)
6.7 to 6.2 (br)
5.0 to 4.8 (br)
3.8 to 3.6 (br)
2.4 to 2.2 (br)
2.1 to 1.2 (br)
1.2 to 0.9 (br)
0.8 to 0.7 (br)

Example 2

2.24 g (yield: 85%) of a white viscous liquid terminal-modified polybutadiene was obtained as in Example 1 except that the amounts of 2,2-ditetrahydrofurylpropane and triisopropoxy aluminum were changed to 0.316 g (1.72 mmol) and 1.61 g (7.88 mmol), respectively, and 17.6 g (48.8 mmol) of 15 wt % n-hexane solution of 1,3-butadiene (Aldrich) was used instead of styrene.

Mn: 1880
PDI: 1.1
$R_f$: 0.82
$^1$H-NMR (CDCl$_3$, 20° C.): δ=5.9 to 5.7 (br)
5.6 to 5.2 (br)
5.1 to 4.8 (br)
3.9 to 3.7 (br)
2.3 to 1.7 (br)
1.6 to 1.0 (br)
0.8 to 0.7 (br)

Example 3

3.90 g (yield: 91%) of a white viscous liquid terminal-modified styrene-butadiene copolymer was obtained as in Example 1 except that the amounts of 2,2-ditetrahydrofurylpropane and triisopropoxy aluminum were changed to 0.331 g (1.80 mmol) and 1.60 g (7.83 mmol), respectively, and a mixture of 11.4 g (31.6 mmol) of 15 wt % n-hexane solution of 1,3-butadiene and 2.58 g (24.8 mmol) of styrene was used instead of styrene alone.

Mn: 2920
PDI: 1.1
$R_f$: 0.83
$^1$H-NMR (CDCl$_3$, 20° C.): δ=7.4 to 6.9 (br)
6.9 to 6.2 (br)
5.8 to 5.0 (br)
5.0 to 4.4 (br)
3.8 to 3.6 (br)
2.6 to 0.9 (br)
0.9 to 0.7 (br)

Example 4

5.43 g (yield: 92%) of a white viscous liquid terminal-modified polystyrene was obtained as in Example 1 except that the amount of 2,2-ditetrahydrofurylpropane was changed to 0.309 g (1.68 mmol), and 1.07 g (8.02 mmol) of trichloroaluminum was used instead of triisopropoxyaluminum. In the case of this Example, the methanolysis reaction is believed to occur due to the methanol used in the purification step (this is the same in Examples 5 to 6).

Mn: 3880
PDI: 1.2
$R_f$: 0.78
$^1$H-NMR (CDCl$_3$, 20° C.): δ=7.2 to 6.9 (br)
6.9 to 6.7 (br)
6.7 to 6.1 (br)
3.8 to 3.6 (br)
2.4 to 2.2 (br)
2.1 to 1.2 (br)
1.2 to 0.9 (br)
0.9 to 0.7 (br)

Example 5

2.17 g (yield: 83%) of a white viscous liquid terminal-modified polybutadiene was obtained as in Example 1 except that the amount of 2,2-ditetrahydrofurylpropane was changed to 0.336 g (1.82 mmol), and 17.4 g (48.3 mmol) of 15 wt % n-hexane solution of 1,3-butadiene was used instead of styrene, and further 1.13 g (8.48 mmol) of trichloroaluminum was used instead of triisopropoxy aluminum.

Mn: 2240
PDI: 1.1
$R_f$: 0.80
$^1$H-NMR (CDCl$_3$, 20° C.): δ=6.0 to 5.6 (br)
5.6 to 5.1 (br)
5.1 to 4.8 (br)
3.9 to 3.7 (br)
2.3 to 1.6 (br)
1.6 to 1.0 (br)
0.9 to 0.6 (br)

Example 6

5.86 g (yield: 87%) of a white viscous liquid terminal-modified styrene-butadiene copolymer was obtained as in Example 1 except that the amounts of 2,2-ditetrahydrofurylpropane and trichloroaluminum, which was used instead of triisopropoxy aluminum, were changed to 0.355 g (1.92 mmol) and 1.61 g (12.1 mmol), respectively, and a mixture of 15.5 g (43.0 mmol) of 15 wt % n-hexane solution of 1,3-butadiene and 4.41 g (42.3 mmol) of styrene was used instead of styrene alone.

Mn: 4220
PDI: 1.2
$R_f$: 0.80
$^1$H-NMR (CDCl$_3$, 20° C.): δ=7.5 to 6.9 (br)
6.9 to 6.1 (br)
5.9 to 5.0 (br)
5.0 to 4.3 (br)
3.8 to 3.6 (br)
2.6 to 0.9 (br)
0.9 to 0.6 (br)

Example 7

4.37 kg of cyclohexane, 300 g of styrene and 734 g of butadiene were weighed out, thrown into an autoclave for polymerization and stirred at 50° C. To the resulting mixture solution, 0.858 g of tetramethylethylenediamine and further 4 mL of n-butyl lithium (1.60 mol/L) were added and stirred at 50° C. for 3 hours. Then, a THF (20 mL) suspension of 2.09 g of triethoxy aluminum was added and stirred at 50° C. for 3 hours to terminate the polymerization. After volatile components were distilled away from the polymer solution, reprecipitation treatment was performed in which a polymer component is thrown into methanol (6.5 kg) to separate the polymer component. Volatile components were further distilled away from the polymer component under reduced pressure. As a result, 962 g (yield: 93%) of a terminal-modified polymer was obtained.

Mn: 299,000
PDI: 1.2
$R_f$: 0.80
$^1$H-NMR (CDCl$_3$, 20° C.): δ=7.5 to 6.9 (br)
   6.9 to 6.1 (br)
   5.9 to 5.0 (br)
   5.0 to 4.3 (br)
   3.8 to 3.6 (br)
   2.6 to 0.9 (br)
   0.9 to 0.6 (br)

Example 8

| | |
|---|---|
| Terminal-modified styrene-butadiene copolymer obtained in Example 7 | 80.00 parts by mass |
| BR (Zeon Corporation, BR1220) | 20.00 parts by mass |
| Silica (Rhodia operations, Zeosil Premium 200MP) | 80.00 parts by mass |
| Carbon black (Tokai Carbon Co., Ltd., Seast KHP) | 5.00 parts by mass |
| Stearic acid (NOF Corporation, YR) | 2.00 parts by mass |
| Fatty acid ester (Schill & Seilacher, HT207) | 1.00 parts by mass |
| Antioxidant (Solutia Europe, 6ppd) | 1.50 parts by mass |
| Coupling agent (Evonik Degussa, Si69) | 6.40 parts by mass |
| Process oil (Showa Shell Sekiyu K.K., Extra No. 4S) | 30.00 parts by mass |
| Zinc oxide (Seido Chemical Industry Co., Ltd., Zinc oxide No. 3) | 3.00 parts by mass |
| Vulcanization accelerator A (Sumitomo Chemical Industry Co., Ltd., Soxinol D-G) | 2.00 parts by mass |
| Vulcanization accelerator B (Ouchi Shinko Chemical Industrial Co., Ltd., Nocceler CZ-G) | 1.70 parts by mass |
| Sulfur (Karuizawa Refinery, oil-treated sulfur) | 1.50 parts by mass |

Among the above components, those except for the vulcanization accelerator and sulfur were kneaded for 5 minutes in a 1.7 L closed Banbury mixer, and the kneaded material was dumped out of the mixer to cool to room temperature. Subsequently, the vulcanization accelerator and sulfur were mixed with the same Banbury mixer. The resulting unvulcanized rubber composition was press-vulcanized for 30 minutes at 150° C. to obtain a vulcanized rubber.

Mooney viscosity was measured for an unvulcanized rubber composition, and each of RPA (the vulcanization Payne's effect), tensile strength, impact resilience (40° C.), fully automatic elongation and high temperature elongation was measured for the vulcanizate. The measured values obtained were expressed as an index where a value for an unmodified styrene-butadiene copolymer (Mn: 293,000) is taken as 100.

Mooney viscosity (viscosity ML$_{1+4}$ [M]): 108
   according with JIS K6300
      Usually, a smaller index corresponds to lower viscosity and means superior processability
      However, in this case, a larger value means superiority since a reciprocal value is used herein
RPA (the vulcanization Payne's effect): 104
   according with ISO 11345
      A smaller index indicates a larger Payne's effect, meaning a superior dispersibility of silica
Tensile strength: 96
   according with JIS K6251
Impact resilience (40° C.): 99
   according with JIS K6255
Fully automatic elongation: 102
High temperature elongation: 118
   according with JIS K6251/6301:2006 corresponding to ISO 48 for both
   A larger index means better elongation of rubber The above results reveal that a diene-based rubber composition having good processability, a large Payne's effect and excellent elongation properties was able to be obtained.

The invention claimed is:

1. Method of manufacturing a terminal-modified polymer, comprising: allowing for a polymerization reaction of a vinyl aromatic monomer, a conjugated diene monomer or both in the presence of an anionic polymerization initiator; and adding an aluminum halide compound thereinto to terminate the polymerization reaction; and then allowing for a reaction with a lower alcohol having 1 to 4 carbon atoms.

2. Method of manufacturing a terminal-modified polymer according to claim 1, wherein trichloroaluminum is used as the aluminum halide compound.

3. Method of manufacturing a terminal-modified polymer according to claim 1, wherein a polymer having a group derived from the aluminum halide compound at a terminal site is formed.

4. Method of manufacturing a terminal-modified polymer according to claim 1, wherein styrene or a derivative thereof is used as the vinyl aromatic monomer.

5. Method of manufacturing a terminal-modified polymer according to claim 1, wherein 1,3-butadiene or isoprene is used as the conjugated diene monomer.

6. Method of manufacturing a terminal-modified polymer according to claim 1, wherein an organolithium compound is used as the anionic polymerization initiator.

* * * * *